United States Patent Office 3,682,687
Patented Aug. 8, 1972

3,682,687
PROCESS FOR PRETREATING GLASS FIBERS FOR REINFORCING RUBBER ARTICLES
Satoru Obuchi, Suita-shi, Osaka-fu, Tokuji Fukuoka, Uji-shi, Kyoto-fu, Saburyo Nagato, Kyoto-shi, Kunio Murakami, Uji-shi, Kyoto-fu, Tamikazu Shigeta, Kyoto-fu, and Hiroyuki Hayashi, Uji-shi, Kyoto-fu, Japan, assignors to Nippon Rayon Kabushiki Kaisha (Nippon Rayon Co., Ltd.), Kyoto-fu, Japan
No Drawing. Filed July 3, 1969, Ser. No. 839,057
Claims priority, application Japan, July 8, 1968, 43/47,723; Dec. 11, 1968, 43/90,707
Int. Cl. G03c 25/02
U.S. Cl. 117—72                     8 Claims

ABSTRACT OF THE DISCLOSURE

This invention relates to a process for pretreating glass fibers for reinforcing vulcanizable rubber articles, which comprises applying to a glass fiber an aqueous dispersion containing an aminosilane and an epoxy compound, and then applying to said glass fibers an aqueous dispersion of a resorcinol-formaldehyde-latex mixture and an N-methylol alkyl amide, and heating said glass fiber thus treated at a temperature of about 110–240° C. The glass fiber obtained has improved adhesion to rubber, which is not deteriorated when left in air for extended periods.

BACKGROUND

Glass fibers are useful as reinforcing materials for various rubber articles such as for example tires, hoses, belts, etc., owing to their high mechanical strength, dimensional stability, resistance to heat etc. On the other hand they exhibit disadvantages such as low wear-resistance owing to poor softness as well as low adhesion properties to rubber.

For a long time, it has therefore been desired to improve the adhesion properties of glass fibers which are embedded in rubber articles for reinforcement. One such process disclosed in U.S. Pat. No. 3,391,052 comprises the steps of coating the bundle of glass fibers with a lubricating material to permit processing of the elastomeric coated glass fibers. The lubricating material is selected from the group consisting of powdered polyethylene, finely divided silica, carbon black, graphite, finely divided glass fibers and finely divided synthetic resinous fibers. The coated bundle of glass fibers are then processed by at least one of the processes of winding, twisting, plying and weaving to the form desired for use in combination with the elastomeric matrix forming material, and then combined with the elastomeric matrix forming material. However, glass fibers treated with such conventional processes have in common the disadvantage of insufficient adhesion to rubber. For example, adhesion properties and mechanical strength of conventionally treated glass fibers are liable to be deteriorated even when left in air for extended periods of time.

In another process for adhering textile materials to rubber (U.S. Pat. 3,097,109), a solid dry vulcanizable rubber composition containing resorcinol and an N-methylol carboxylic acid amide is applied to textile material, and the assembly is heated to vulcanize the rubber and to firmly adhere the textile material to the rubber composition.

In processes discovered by one of the co-inventors of this invention and his associates (Japanese patent publications No. 5110/1966 and No. 5111/1966), an aqueous dispersion containing a resorcinol-formaldehyde-latex mixture and an N-methylol alkyl amide is used for improving the adhesion properties of organic synthetic fibers such as nylon, rayon, etc. to vulcanizable rubbers. The use of the amino-silane and epoxy compound are not used in such non-glass fiber treatment.

However, it is difficult to improve sufficiently the adhesion properties of glass fibers to vulcanizable rubber by such known processes.

It has now unexpectedly been found that the adhesion properties of glass fibers to vulcanizable rubber can be greatly improved by the process of the invention as hereinafter described and claimed. It is found that the improved adhesion properties of glass fibers obtained according to this invention are hardly deteriorated even when the resulting glass fibers are left in air for a long period of time. Moreover various other advantageous properties such as high mechanical strength, wear-resistance in bent state of the glass fibers embedded in vulcanizable rubber can also be obtained according to this invention.

SUMMARY

An object of this invention is to provide a process for pre-treating glass fibers for embedding in rubber structures as reinforcing materials so as to impart improved adhesion properties to bind the fibers to rubber, and to obtain rubber articles reinforced with glass fibers having improved mechanical properties.

According to this invention, there is provided a process for pretreating glass fibers for reinforcing vulcanizable rubber articles, in which (a) a glass fiber is first contacted with an aqueous dispersion containing an aminosilane and an epoxy compound, Thereafter the treated fiber is (b) contacted with an aqueous dispersion containing resorcinol-formaldehyde-latex mixture and an N-methylol alkyl amide, and (c) the fiber is then heated at a temperature of about 110–240° C.

The pretreated glass fiber according to this invention has improved adhesion properties to vulcanizable rubber, which are not deteriorated even when left in air over extended periods of time. It offers various other advantages such as high mechanical strength and dimensional stability in the bent state. Thus, rubber articles reinforced with the glass fibers of this invention has various improved mechanical properties in comparison with those reinforced with conventionally pretreated glass fibers.

Any of the conventional glass fibers may be used, preferably in the form of a strand of glass fibers. Examples include filament, yarn, bundle, cord and fabric.

Aminosilanes suitable for the purpose of this invention include for example γ-aminopropyl trialkoxysilane, γ-(β-aminoethyl-amino) propyl trialkoxysilane, γ-aminopropyl dialkoxysilane, γ-(β-aminoethyl-amino) propyl methyl dialkoxysilane and the like, in which the alkoxy group may be a methoxy or an ethoxy group. Suitable epoxy compounds can be exemplified by the following compounds: diglycidyl ethers of polyhydric phenols, such as bisphenols A diglycidyl ether; diglycidyl ethers of polyhydric alcohols such as diglycidyl ethers of ethylene glycol, polyethylene glycol, glycerol etc.

When the aqueous dispersion containing an aminosilane and an epoxy compound is applied to glass fibers in the course of gathering glass fibers into a single strand, it is possible to use a dispersion having a higher concentration than that of the dispersion applied after gathering since in the latter case the strand which has preferable been wound up onto a wind-up means such as bobbin is released therefrom and treated with a lower speed.

The ratio of the aminosilane and epoxy compound as dispersoids in the aqueous medium should be in the range of from about 1:15 to 3:2 by weight. An excessive amount of the aminosilane contained in the dispersion can give rise to deteriorative effects on the pretreated glass fibers, while an excessive amount of the epoxy compound is liable to lower the stability of the solution.

It is in general preferred to deposit the dispersoids on the surfaces of the glass fibers in an amount of about 0.05–0.6% by weight of glass fibers.

The concentration of the dispersion may vary with various conditions such as, for example, the amount of the dispersoids which are required to deposit on the surfaces of the glass fibers and further depends upon whether the dispersion containing the aminosilane and an epoxy compound is applied to a glass fiber or to a gathered strand of fibers. However, in order to deposit the dispersoids on the surfaces of glass fiber in an amount of about 0.05 to 0.6% by weight of glass fiber, it is generally advantageous to apply an aqueous dispersion at a concentration of the dispersoids of about 0.5 to 12% to glass fiber during gathering and at a concentration of about 0.1 to 1.2% after gathering to glass fiber strand. This is true since in the former case the glass fibers are melt-spun and then gathered into a single strand with a large speed, which may incur a partial loss of the dispersoid deposited on the surfaces of glass fibers.

The dispersion is preferably applied to the glass fiber or fibers at room temperature in a suitable manner such as impregnation, spraying roller coating etc.

An aqueous dispersion(s) containing resorcinol-formaldehyde-latex mixture and an N-methylol alkyl amide is then applied to the glass fibers.

It is possible to use any of the conventional RFL dispersions for the process of this invention in conventional manner. A preferred RFL dispersion can be prepared for example in the following manner:

Resorcinol and formaldehyde (37%) are mixed at a ratio of 1:2 to 3:1 by weight. The mixture is adjusted to a pH of about 2 to 7 and left for 2 to 6 hours for ripening. After this, the mixture is admixed with a rubber latex (40% solids) at a ratio of 1:10 to 1:25 by weight. Water is then added to give a preparate having a solid content of 20 to 40% by weight.

Preferable rubber latexes include, for example, styrene-butadiene-vinylpyridine-terpolymer latex. These latexes can be used solely. Alternatively it is also possible to add one or more members of styrene-butadiene latex, natural rubber latex and acrylonitrile butadiene latex in an amount of not more than 60% by weight of the substrate. Other rubbers which can be used are e.g. butadiene polymers and copolymers with styrene, vinylpyridine, isoprene, chloroprene and acrylonitrile.

For example, N-methylol acid amides of stearic acid, parmitic acid or lauric acid can preferably be used as N-methylol alkyl amide of this invention. Other suitable amides are N-methylol acid of eicosanoic acid amide, myristic acid amide and pelargonic acid amide. It is possible to apply an aqueous dispersion containing about 0.2–2.0% of N-methylol alkyl amide solely to the glass fiber before or after applying the RFL mixture. It is also possible to admix the N-methylol alkyl amide (preferably 0.2–3.0% by weight of the solution) with the RFL dispersion.

Suitable N-methylol alkyl amides may be represented by the formula $$RCONHCH_2OH$$

Where R stands for an alkyl group having 8 to 20, preferably 9 to 17 carbon atoms.

For applying the dispersion of aminosilane and epoxy compound and/or the dispersion of the N-methylol alkyl amide, it is possible to use a suitable conventional means such as, for example, coating rolls, spraying, impregnating, etc.

In order to carry out the subsequent heat-treatment, it is preferred to gather several strands of the glass fibers into a bundle having substantially no twist, while it is also possible to use a glass fiber or a strand of glass fibers solely if desired.

The glass fibers which are preferably in the form of a bundle of several strands are heated at a temperature of about 110–240° C. to carry out the resinification reaction of resorcinol and formaldehyde. The baking time required for completion of the resinification reaction is preferably about 10–90 seconds, depending upon the various conditions such as amounts of solids deposited on the surfaces of the glass fibers, the baking temperature, etc.

In order to remove the water content contained in the deposited dispersion and to have the dispersion penetrate well into the interior of the glass fiber strand, it is advantageous to dry the strand before baking. The drying can be carried out in ambient temperature, for example, for more than 24 hours. However, from practical viewpoint, it is preferred to dry the strand before baking at a temperature of about 40–110° C. for about 10–90 seconds.

The glass fibers obtained by the process of this invention can be used for reinforcing various vulcanizable rubbers in conventional manner. They are preferably in the form of a strand, while it is also possible, if desired, to gather further several strands into a cord having slight twists, preferably about 4–16 turns per 10 cm. for reinforcing purpose.

Throughout the specification, percentages and parts are given by weight.

In the following specification, adhesion (kg./cm.) is determined by the so called H-test method carried out in a similar manner to that defined by ASTM No. D–2138–62T. Wear-resistance in bent state (turns) is determined by burdening a sample of glass fiber cord (length—4.5 cm.; twists—6 turns per 10 cm.) with a load of 500 g. at its one end, hanging the same at 30 cm. distance from the loaded end, swinging the same back and forth with an angle of 35° respectively and on a cycle of 40 turns per minute until the cord cuts off.

Filaments of non-alkali glass fiber were used in the examples.

Example 1

An aqueous dispersion containing γ-aminopropyl trimethoxy silane and bisphenol A diglycidyl ether at a ratio of 7:1 and at a concentration of solids of 4.0% by weight was separately prepared. Non-alkali glass fiber filaments (diameter—9μ) were gathered with a speed of 3,500 m./min. into a single strand (count—75). In the course of gathering, a conventional rubber roller was used for coating the aqueous dispersion on the surfaces of glass fibers. After drying, the amount of the solids deposited on the surfaces of the glass fibers was 0.2% by weight.

Separately, resorcinol and formaldehyde (37%) were mixed together at a ratio of 1.4:1. After adjusting the pH to 4.0 and leaving for 4 hours at ambient temperature for ripening, the mixture (10 parts) was added to a mixed latex (185 parts) containing styrene-butadiene-vinylpyridine-terpolymer latex and styrene-butadiene rubber latex at a ratio of 8:20. Water was then added (35 parts) to obtain a resorcinol-formaldehyde-latex mixture to which was further added N-methylol stearic acid amide (1.6% by weight) to give a modified RFL dispersion. The glass fiber strand was dipped in the modified dispersion and five strands were gathered into a cord.

The cord was divided into several fractions. They were respectively heat-treated under the conditions shown in Table 1 and were given by twists of 6 turns/10 cm. Physical properties of respective fractions were determined and are shown in Table 1.

TABLE 1

| Drying T | Time (sec.) | Baking[1] T | A | B | C2 | C20 |
|---|---|---|---|---|---|---|
| RT | ([2]) | 150 | 24.5 | 425 | 11.3 | 10.5 |
| RT | ([3]) | 150 | 31.0 | 728 | 13.2 | 13.0 |
| 60 | 60 | 150 | 32.0 | 730 | 13.3 | 13.1 |
| 100 | 35 | 120 | 31.0 | 732 | 12.9 | 12.7 |
| 100 | 35 | 150 | 32.1 | 721 | 13.4 | 13.1 |
| 100 | 35 | 200 | 30.4 | 680 | 13.3 | 13.1 |
| 100 | 35 | 220 | 26.2 | 500 | 12.2 | 12.0 |
| 100 | 35 | 250 | 23.1 | 400 | 9.8 | 9.5 |
| 110 | 35 | 150 | 31.7 | 700 | 13.4 | 13.0 |

[1] Baking time—35 seconds.
[2] Immediately after dipping.
[3] 48 hours after dipping.

T=Temperature (° C.).
RT=Room temperature (about 20° C.):
A=Strength (kg.).
B=Wear-resistance in bent state (turns):
C2=Adhesion after 2 days (kg./cm.).
C20=Adhesion after 20 days (kg./cm.).

From this table, the following conclusions are drawn:

(1) When the glass fibers are baked immediately after the application of the modified RFL dispersion, the physical properties are inferior to those which are obtained by baking after sufficient drying.

(2) When the glass fibers are baked at 250° C., the physical properties of the obtained glass fibers are inferior in comparison with those obtained by baking at 120–200° C.

(3) It is possible to obtain good results even when the glass fibers are dried in ambient temperature for a sufficient period of time such as 48 hours.

(4) Better results can be obtained when the glass fibers are preheated at a lower temperature and are then baked at a higher temperature. It is also possible to carry out the baking and drying at an even temperature.

(5) When the glass fibers are baked at a temperature lower than 110° C. or higher than 240° C., the physical properties of the obtained glass fibers are liable to deteriorate (A 24.0; C2 10.0) so that the temperature range is preferable within 110–240° C.

Example 2

Four types of aqueous dispersions were separately prepared under conditions shown in Table 2. The first and the second contained γ-aminopropyl triethoxy silane and bisphenol A diglycidyl ether at ratios of 1:15 and 1:7 by weight respectively. The third and fourth contained γ-(β-aminoethyl) aminopropyl trimethoxy silane and ethylene glycol diglycidyl ether at ratios of 1:7 and 3:2 respectively. Each of the aqueous dispersions were divided and made up with water to have concentrations of solids of 0.5, 4.0 and 12.0% by weight respectively.

Non-alkali glass fiber strands were prepared by gathering non-alkali glass fibers (diameter—9μ) with a speed of 3,500 m./min. into a single strand (count—75). In the course of gathering, to each strand was respectively applied each aqueous dispersion by means of a conventional rubber roller. The amounts of the dispersoids deposited on the surfaces of the glass fibers were respectively 0.05, 0.2 and 0.6% by weight of glass fiber, by applying the dispersions containing 0.5, 4.0 and 12% solids.

Separately, resorcinol was added with formaldehyde (37%) at a ratio of 1.4:1. After adjusting the pH to 4.0, the mixture was left for 4 hours for ripening. To the ripened mixture (10 parts) was added a styrene-butadiene-vinylpyridine-terpolymer latex (40% solids; 185 parts) and water (35 parts). To the mixture was then added N-methylol stearic acid amide with stirring to give a concentration of the N-methylol stearic amide of 1.6%. The thus prepared mixture was used for dipping the gathered strands. Each five strands of the respective types were gathered into a single cord.

Each cord was dried at 100° C. for 30 seconds and was then baked at 150° C. for 30 seconds. After this the cord was given twists of 6 turns/10 cm.

A comparison cord was separately prepared in a similar manner to that disclosed in Japanese patent publications Nos. 5,110/1966 and 5,111/1966, in which the strand was treated in a similar manner to that described in this example except, that in the course of gathering the strand starch was applied in an amount of 0.5% by weight in place of the aminosilane and epoxy compound.

Physical properties of the obtained cords were determined to give the results shown in Table 2. From this table, it is apparent that the physical properties of the cords treated by the process of this example such as mechanical strength, wear-resistance in bent state, adhesion to rubber and its changes owing to the ageing are superior to those of the control cord.

TABLE 2

| Aminosilane epoxy compound | A | B | C | D | E2 | E20 |
|---|---|---|---|---|---|---|
| γ-Aminopropyl triethyoxy silane, bisphenol A diglycidyl ether | 1:15 | 0.05 | 29.2 | 530 | 13.0 | 12.7 |
| | | 0.2 | 30.0 | 694 | 13.0 | 12.8 |
| | | 0.6 | 27.7 | 611 | 13.1 | 12.8 |
| Do | 1:7 | 0.05 | 29.4 | 629 | 13.1 | 12.6 |
| | | 0.2 | 32.1 | 721 | 13.4 | 13.1 |
| | | 0.6 | 28.6 | 513 | 13.0 | 12.8 |
| γ-(β-Amino ethyl) aminopropyl trimethoxy silane, ethylene glycol diglycidyl ether. | 1:7 | 0.05 | 28.8 | 521 | 12.7 | 12.5 |
| | | 0.2 | 30.5 | 658 | 12.8 | 12.5 |
| | | 0.6 | 26.4 | 504 | 12.7 | 12.6 |
| Do | 3:2 | 0.05 | 27.1 | 587 | 12.8 | 12.5 |
| | | 0.2 | 29.5 | 637 | 12.9 | 12.5 |
| | | 0.6 | 26.2 | 519 | 12.8 | 12.4 |
| Control | | 1.5 | 15.0 | 162 | 8.9 | 7.2 |

A=Composition rate by weight.
B=Amount of the solids deposited on the surface of glass fiber (percent).
C=Strength (kg.).
D=Wear-resistance in bent state (turns).
E2=Adhesion after 2 days (kg./cm.).
E20=Adhesion after 20 days (kg./cm.).

Example 3

An aqueous dispersion containing γ-(β-amino-ethyl) aminopropyl trimethoxy silane and bisphenol A glycidyl ether at a ratio of 1:7 and at a concentration of solids of 4.0% by weight was separately prepared.

Non-alkali glass fiber filaments (diameter—9μ) were gathered with a speed of 3,500 m./min. into a single strand (count—150). In the course of gathering, the aqueous dispersion was applied to the strand by means of a conventional rubber roller. After drying, the dispersoids in an amount of 0.2% by weight was applied to the glass fiber strand.

Resorcinol-formaldehyde mixture respectively containing resorcinol and formaldehyde (37%) at weight ratios of 1:2, 1.4:1 and 3:1 were prepared. They were left for 4 hours at ambient temperature for ripening and were adjusted respectively to pH's shown in Table 4. Each mixture (10 parts) were added with a styrene-butadiene-vinyl pyridine terpolymer latex (185 parts) and water (35 parts) and were further added with N-methylol stearic acid amide (1.6% by weight) to give each of modified RFL mixtures.

Ten strands were gathered into a cord. Each RFL mixture was used for dipping each cord which was then baked at 100° C. for 30 seconds and at 150° C. for 30 seconds. Then the cord was given with twists of 6 turns/10 cm.

Physical properties of the cords thus obtained were determined and shown in Table 3, from which it is apparent that the glass fibers treated by the process of this example have improved physical properties.

TABLE 3

| A | B | C | D | E | F | G2 | G20 |
|---|---|---|---|---|---|----|-----|
| 1 | 2 | 4 | 2 | 27.4 | 539 | 13.1 | 12.8 |
|   |   |   | 4 | 29.6 | 620 | 13.1 | 12.8 |
|   |   |   | 6 | 29.4 | 613 | 13.0 | 12.8 |
| 1.4 | 1 | 2 | 4 | 30.8 | 700 | 13.2 | 13.0 |
|   |   | 4 |   | 32.1 | 721 | 13.4 | 13.1 |
|   |   | 7 |   | 31.0 | 704 | 13.3 | 13.0 |
| 3 | 1 | 4 | 4 | 30.4 | 697 | 13.3 | 12.9 |

A=Resorcinol.
B=Formaldehyde (37%)
C=Adjusted pH.
D=Ripening time (hour).
E=Strength (kg.).
F=Wear-resistance in bent state (turns).
G2=Adhesion after 2 days (kg./cm.).
G20=Adhesion after 20 days (kg./cm.).

Example 4

(a) Non-alkali glass fiber filaments (diameter—9μ) were gathered with a speed of 3,500 m./min. into a single strand (count—75) which was then wound up onto a bobbin. Separately, an aqueous dispersion containing γ-(β-aminoethyl) aminopropyl trimethoxy silane and bisphenol A diglycidyl ether at a ratio of 1:7 and at a concentration of solids of 0.4% by weight was prepared and was put into a bath. In the course of releasing from the bobbin, the strand was passed through the bath with a speed of 50 m./min. After drying, to the strand was deposited the dispersoids in an amount of 0.2% by weight. Separately, resorcinol was added with formaldehyde (37%) at a ratio of 1.4:1. After adjusting the pH to 4.0, the mixture was left for 4 hours at ambient temperature for ripening.

A styrene-butadiene-vinyl pyridine-terpolymer latex (185 parts) and water (5 parts) were added to the ripened mixture (10 parts). N-methylol stearic acid amide (1.6% by weight) was further added to give a modified RFL dispersion. The strand was dipped in the RFL dispersion and five strands were gathered into a cord, which was heat-treated at 100° C. for 30 seconds and at 150° C. for 30 seconds, and the cord given twists of 6 turns/10 cm.

Similar treatments to those described above were carried out twice except the amounts of water were 35 and 205 parts respectively.

(b) A similar treatment to that described in (a) was carried out except that a mixed latex (185 parts) containing a styrene-butadiene-vinyl pyridine-terpolymer latex and a styrene-butadiene latex at a ratio of 30:70 by weight and water (35 parts) was used.

(c) A similar treatment to that described in (a) was carried out except that a mixed latex (185 parts) containing a sytrene-butadiene-vinyl pyridine-terpolymer latex and a natural rubber latex at a ratio of 50:50 by weight and water (35 parts) was used.

(d) A similar treatment to that described in (a) was carried out except that a mixed latex (185 parts) containing a styrene-butadiene-vinyl pyridine-terpolymer latex and an acrylonitrile butadiene latex at a ratio of 70:30 by weight and water (35 parts) was used.

(e) A similar treatment to that described in (a) was carried out by using a styrene-butadiene latex (185 parts) and water (35 parts).

Physical properties of the glass fibers obtained are shown in Table 4.

TABLE 4

| A | B | C | D | E | F2 | F20 |
|---|---|---|---|---|----|-----|
| (a) Styrene-butadiene-vinyl pyridine-terpolymer [1] | 185 | 5 | 30.4 | 842 | 13.4 | 13.2 |
|  |  | 35 | 32.1 | 721 | 13.4 | 13.1 |
|  |  | 205 | 30.5 | 719 | 13.0 | 12.8 |
| (b) Styrene-butadiene-vinyl pyridine-terpolymer [1] (30), and styrene-butadiene (70) latex [2] | 185 | 35 | 29.0 | 690 | 13.2 | 13.0 |
| (c) Styrene-butadiene-vinyl pyridine-terpolymer [1] (50), and natural rubber (50) | 185 | 35 | 28.2 | 694 | 13.2 | 12.9 |
| (d) Styrene-butadiene-vinyl pyridine-terpolymer (70), and acrylonitrile-butadiene rubber latex [3] (30) | 185 | 35 | 26.4 | 493 | 14.0 | 13.6 |
| (e) Styrene-butadiene latex [3] | 185 | 35 | 24.1 | 420 | 10.5 | 9.8 |

[1] Gen-Tac (available from General Tire and Rubber Co., U.S.A.).
[2] Naugatex J-9049 (available from Sumitomo Naugatuck K. K., Japan).
[3] Hycar 1562 (available from Nippon Zeon K. K., Japan).
A=Latex composition (ratio by weight).
B=Amount of latex (part).
C=Amount of water (part).
D=Strength (kg.).
E=Wear-resistance in bent state (turn).
F2=Adhesion after 2 days (kg./cm.).
F20=Adhesion after 20 days (kg./cm.).

Example 5

Non-alkali glass fiber filaments (diameter—9μ) were gathered with a speed of 3,500 m./min. into a strand (count—75). In the course of gathering, to the glass fibers was applied an aqueous dispersion containing γ-aminopropyl triethoxy silane and bisphenol A diglycidyl ether at a ratio of 1:7 and at a concentration of solids of 3.0% by weight by using a conventional rubber roller. After drying, the dispersoid was deposited on the strand in an amount of 0.15% by weight.

Separately, resorcinol and formaldehyde (37%) was added together at a ratio of 1.4:1. The mixture was adjusted to a pH of 4.0 and was left for 4 hours at ambient temperature for ripening. To each fraction of the ripened mixture (10 parts) was added a styrene-butadiene-vinyl pyridine-terpolymer latex (185 parts) and water (35 parts) to give RFL dispersions.

(a) To RFL dispersions was added N-methylol stearic acid amide in an amount respectively of 0, 0.2, 0.7, 1.6 and 2.7% by weight to give modified RFL dispersions. Glass fiber strands were dipped in respective modified RFL dispersions. Five dipped strands were gathered to form a cord which was then heat-treated at 100° C. for 30 seconds and at 150° C. for 30 seconds. The cord was given twists of 6 turns/10 cm.

(b) Similar treatments to that described above were carried out by using N-methylol parmitic acid amide (1.6%) and N-methylol lauric acid amide (1.6%) respectively.

Physical properties of the obtained glass fibers are shown in Table 5.

Example 6

Similar treatments to that described in Example 5 were carried out with the exception that the gathered strands were respectively dipped in aqueous dispersions containing N-methylol stearic acid amide and N-methylol parmitic acid amide shown in Table 5 respectively and then dipped in the ripened RFL dispersion without containing N-methylol alkyl amide.

Physical properties of the obtained glass fibers are shown in Table 5.

Example 7

Similar treatments to that described in Example 5 were carried out with the exception that respective strands were first dipped in the RFL dispersion not containing N-methylol alkyl amide, and were then dipped in an aqueous dispersion containing N-methylol stearic acid amide and N-methylol lauric acid amide as shown in Table 5 respectively.

Physical properties of the obtained glass fibers are shown in Table 5.

TABLE 5

| Example | A | | B | C | D | E2 | E20 |
|---|---|---|---|---|---|---|---|
| 5 | Stearic | { | 0 | 28.6 | 720 | 12.6 | 9.5 |
|  |  |  | 0.2 | 29.0 | 735 | 12.7 | 11.9 |
|  |  |  | 0.7 | 29.9 | 708 | 12.9 | 12.0 |
|  |  |  | 1.6 | 32.1 | 721 | 13.4 | 13.1 |
|  |  |  | 2.7 | 32.4 | 789 | 13.5 | 13.2 |
|  | Parmitic |  | 1.6 | 30.3 | 693 | 13.0 | 12.9 |
|  | Lauric |  | 1.6 | 29.5 | 702 | 12.7 | 12.4 |
| 6 | Stearic | { | 0.2 | 28.9 | 612 | 12.6 | 11.4 |
|  |  |  | 0.7 | 30.1 | 604 | 12.7 | 12.2 |
|  |  |  | 2.0 | 30.6 | 683 | 13.1 | 13.0 |
|  | Parmitic |  | 2.0 | 30.1 | 687 | 13.0 | 12.7 |
| 7 | Stearic | { | 0.2 | 27.7 | 593 | 12.4 | 11.7 |
|  |  |  | 0.7 | 30.5 | 641 | 12.6 | 11.9 |
|  |  |  | 2.0 | 30.8 | 690 | 13.0 | 12.8 |
|  | Lauric |  | 2.0 | 28.7 | 633 | 12.8 | 12.4 |

A=Types of methylol alkyl amides.
B=Concentration (percent by weight).
C=Strength (kg.).
D=Wear-resistance in bent state (turn).
E2=Adhesion after 2 days (kg./cm.).
E20=Adhesion after 20 days (kg./cm.).

Example 8

Non-alkali glass fiber filaments (diameter—7µ) were gathered with a speed of 3,500 m./min. into a strand (count—75). In the course of gathering, a conventional rubber roller was used to apply on the strand an aqueous dispersion containing γ-aminopropyl trimethoxy silane and bisphenol A glycidyl ether at a ratio of 1:7 and at a concentration of solids of 4.0% by weight. After drying, the strand was deposited with the dispersoids in an amount of 0.2% by weight.

The strand was treated in a similar manner to that described in Example 1. Physical properties of the obtained glass fibers were as follows:

Strength—34.0 kg.
Wear-resistance in bent state—960 turns
Adhesion after 2 days—13.0 kg./cm.
Adhesion after 20 days—12.9 kg./cm.

What is claimed is:

1. A process for pretreating glass fibers for reinforcing vulcanizable rubber articles, which comprises: first applying to the glass fibers an aqueous dispersion containing an aminosilane and a diglycidyl ether of bisphenol A in which the ratio by weight of aminosilane to said ether contained in the aqueous dispersion is 1:15 to 3:2, thereafter applying to said glass fibers in the form of an aqueous dispersion a resorcinol-formaldehyde-latex mixture, and an N-methylol alkyl amide whose alkyl group has 8 to 20 carbon atoms, said amide being employed at a concentration of 0.2 to 3.0% by weight of the treat dispersion, and heating said glass fibers thus treated to a temperature of 110 to 240° C. for a time sufficient to effect the resinification reaction.

2. The process of claim 1, in which the amino-silane is selected from the group consisting of γ-aminopropyl trimethoxy silane, γ-aminopropyl triethoxy silane, γ-(β-amino-ethyl) propyl trimethoxy silane, and γ-(β-aminoethyl) propyl triethoxy silane.

3. The process of claim 1, in which the solids concentration of the aqueous dispersion is 0.05–12% by weight.

4. The process of claim 1, in which the amount of the aminosilane and diglycidyl ether of bisphenol A applied to the glass fiber is 0.05 to 0.6% by weight of glass fiber.

5. The process of claim 1, in which the heat-treatment is carried out for 10 to 90 seconds.

6. The process of claim 1, in which prior to the heat-treatment, the glass fiber is preheated at a temperature of 40 to 110° C.

7. The process of claim 1, in which the aqueous dispersion containing resorcinol, formaldehyde and latex, and the aqueous dispersion containing N-methylol alkyl amide are separately applied to the glass fiber.

8. The process of claim 7, in which the concentration of the N-methylol alkyl amide in its aqueous dispersion is 0.2–2.0% by weight.

References Cited

UNITED STATES PATENTS

| 3,169,884 | 2/1965 | Marzocchi et al. | 117—126 GS |
| 3,211,684 | 10/1965 | Eakins | 117—126 X |
| 3,367,793 | 2/1968 | Atwell | 117—126 X |
| 3,509,012 | 4/1970 | Marzocchi | 117—126 X |

FOREIGN PATENTS

| 66/5,110 | 3/1966 | Japan. |
| 66/5,111 | 3/1966 | Japan. |

WILLIAM D. MARTIN, Primary Examiner

D. COHEN, Assistant Examiner

U.S. Cl. X.R.

117—126 GN, 126 GB